M. FOWLER,

Assignor to R. WALLACE.

Process of Making Sheet Metal Spoons.

No. 9,480. Reissued Nov. 23, 1880.

WITNESSES:

Joseph A. Miller Jr.,

Wm. L. Arsh.

INVENTOR:

Mallory Fowler.

by Joseph A. Miller.

N. PETERS, PHOTO-LITHOGRAPHER, WASHINGTON, D. C.

UNITED STATES PATENT OFFICE.

MALTBY FOWLER, OF NORTHFORD, CONNECTICUT, ASSIGNOR TO ROBERT WALLACE.

PROCESS OF MAKING SHEET-METAL SPOONS.

SPECIFICATION forming part of Reissued Letters Patent No. 9,480, dated November 23, 1880.

Original No. 202,431, dated April 16, 1878. Application for reissue filed March 15, 1880.

*To all whom it may concern:*

Be it known that I, MALTBY FOWLER, of Northford, in the county of New Haven and State of Connecticut, have invented a new and useful Improvement in the Art of Manufacturing Tinned-Iron Spoons; and I hereby declare the following to be a full, clear, and exact description of the invention, such as will enable others skilled in the art to which it pertains to make and use it, reference being had to the accompanying drawings, which form a part of this specification.

My invention relates to the manufacture of tinned-iron spoons having faced bowls and edged handles. Its object is to make such spoons with a planished even coating of tin over their entire surfaces; and the invention consists in punching the blanks from sheet iron or steel, in facing the edging of the blanks from which the spoons are made before the blanks are tinned and before the operations of stamping the handles, raising the bowls, and forming the spoons are performed.

Figure 1:
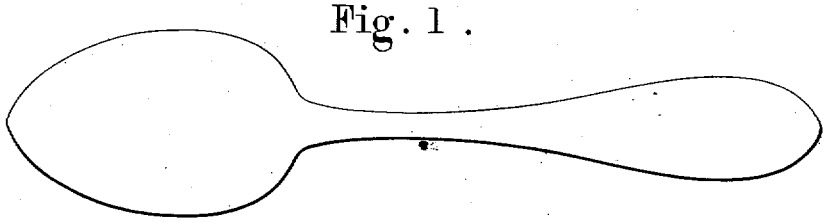
Figure 2:
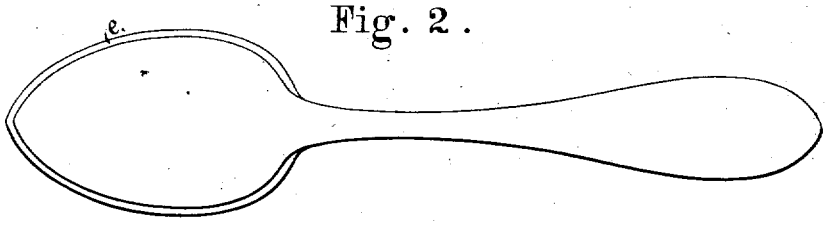
Figure 3:
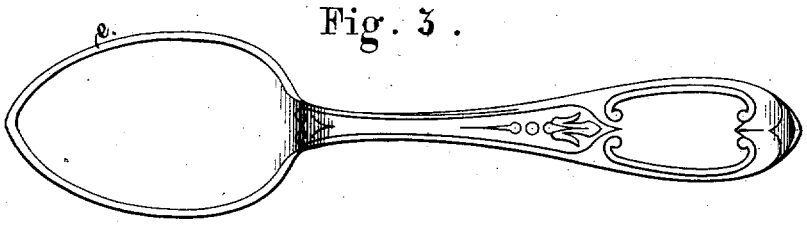

Figure 1 is a view of a blank as punched from sheet-iron. Fig. 2 is a view of a blank. The portion forming the handle is smoothed and finished. Fig. 3 is a view of a finished spoon as ornamented and planished by stamping in the dies.

The blanks are punched from sheet iron or steel in the usual way, in the form shown in Fig. 1, and are faced—that is, the portions of the blanks forming the bowls have their edges beveled at such an angle (shown in Fig. 2) that when the bowls are raised the beveled edges *e* in the blanks become the facings *e* of the bowls. The portions of the blanks forming the handles have their edges smoothed and formed into proper shape, the operation being called "edging." The blanks are then tinned by the usual process. The next steps are to stamp the handles, raise the bowls, and form the spoons. These operations may be performed singly by several dies, or at one operation by a single die or pair of dies, the dies planishing the tinned surfaces by condensing the tin.

As generally practiced heretofore, the blanks have been tinned and the bowls have been raised before they were faced and before the handles were edged. The facing and edging took off the tin and showed the iron.

When the handles are ornamented as shown in Fig. 3 such ornaments are sharper and more delicate when they are stamped on the tinned blank, as the tin flows more readily into the depressions of the dies than the steel or iron. When stamped before tinning the blank such ornaments are injured by the tinning, and lose the sharp impressions of the dies.

By my improved process I am able to make a cheap iron or steel spoon having a faced bowl, edged handle, and a planished even coating of tin, ready for use or silver-plating.

When graded spoons are made by my improved process the blanks are punched in the form shown in Fig. 1, the bowl portion and the wide part of the handle are rolled to the required thickness, and the graded blank is trimmed by dies to the form shown in Fig. 1, when the graded blank is subjected to the processes in the order hereinbefore described for punched sheet-metal blanks.

Having stated my invention and described my process for making an improved tinned-iron spoon, what I claim as new, and desire to secure by Letters Patent, is—

1. In the art of manufacturing tinned sheet-metal spoons, the method of tinning the handle and afterward stamping the ornaments thereon, substantially as set forth.

2. The herein-described improvement in the art of manufacturing tinned iron or steel spoons having faced bowls and edged handles, the same consisting in the several operations performed in the order named—to wit, in punching the blanks, in facing the portion forming the bowl, and edging the portion forming the handle, in tinning the blank, stamping the handle, raising the bowl, and forming the spoon in dies after tinning, substantially as set forth.

3. The improvement in the art of manufacturing tinned iron or steel spoons, the same consisting in trimming the edge of the bowl and the edge of the handle before tinning, and in stamping the handle after tinning, so as to planish the tinned surface, as described.

4. The improvement in the art of manufacturing tinned iron or steel spoons, consisting in tinning the blank and afterward stamping it, so as to planish the tinned surface by stamping, substantially as set forth.

In witness whereof I have hereunto affixed my name.

MALTBY FOWLER.

Witnesses:
F. C. BARTHOLOMEW,
JENNIE E. SMITH.